United States Patent

Panella

[11] 3,943,708
[45] Mar. 16, 1976

[54] TWO AREA ROCKET NOZZLE
[75] Inventor: Edward A. Panella, Ridgecrest, Calif.
[73] Assignee: The United States of America as represented by the Secretary of the Navy, Washington, D.C.
[22] Filed: Nov. 26, 1973
[21] Appl. No.: 419,177

[52] U.S. Cl. ................................ 60/242; 60/271
[51] Int. Cl.² ................................ F02K 1/08
[58] Field of Search .................. 60/242, 254, 271

[56] References Cited
UNITED STATES PATENTS

| | | | |
|---|---|---|---|
| 3,011,309 | 12/1961 | Carter | 60/242 |
| 3,495,408 | 2/1970 | Frey | 60/242 |
| 3,608,312 | 9/1971 | Miltenberger | 60/271 |

Primary Examiner—Verlin R. Pendegrass
Attorney, Agent, or Firm—R. S. Sciascia; Roy Miller; Lloyd E. K. Pohl

[57] ABSTRACT

A pintle screwed into an explosive bolt and released when the bolt is exploded is used to alter the area of a rocket nozzle while the rocket is in flight.

1 Claim, 1 Drawing Figure

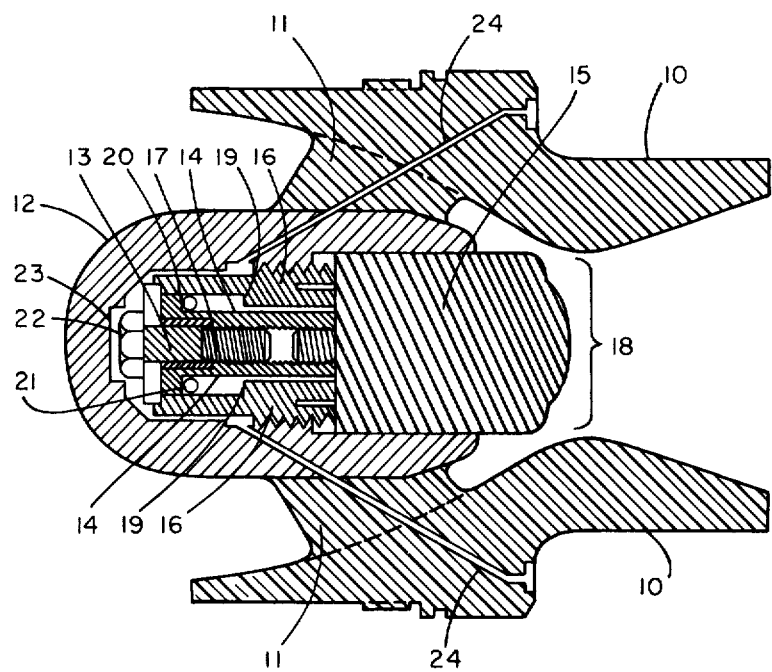

TWO AREA ROCKET NOZZLE

BACKGROUND OF THE INVENTION

1. Field of the Invention

This invention relates to devices for altering the area of a rocket nozzle and thus controlling thrust while the rocket is in flight.

2. Description of the Prior Art

It is known that it is sometimes desirable to adjust the exhaust area of the nozzle of a rocket which utilizes solid propellant during flight. Adjustment of the exhaust area provides control over thrust which cannot be accomplished by merely varying the amount of propellant burned in a solid rocket as it can in a liquid or hybrid rocket. Decreasing the exhaust area increases pressure within the motor and thus boosts thrust.

Variable-area rocket nozzles which permit thrust change substantially throughout the flight of the rocket are known. Such nozzles are very sophisticated. However, thrust control throughout the entire flight of a rocket is not always necessary. Also, the sophisticated variable-area nozzles have a drawback in that they utilize complicated and delicate pressure sensing, hydraulic and electrical parts and such parts are subject to frequent failure.

Since continuous thrust control is often not necessary and variable-area nozzles have drawbacks, research has been conducted on simplified two area rocket nozzles in which a relatively large throat area is provided at launch time and in which the throat area is decreased some time during flight to provide increased thrust.

In the most closely related device for decreasing the exhaust area of a solid rocket nozzle during flight known to the inventor, a housing containing a piston held pintle is suspended within the combustion chamber of the rocket just in front of the nozzle throat. The piston which holds the pintle is held in position by a shear pin at launch and retains the pintle out of (forward from) the nozzle throat. During flight, a gas generator produces gas which presses rearwardly on the piston, causes the shear pin to shear and forces the piston rearwardly. When the piston moves rearwardly, the pintle, which is held by the piston, moves into the throat of the nozzle and decreases the exhaust area.

The above-described device has two primary drawbacks. First, shear pins are somewhat unreliable in that they must be strong enough to retain when they are supposed to retain (e.g. retaining the pintle should the motor be inadvertently dropped in handling) and weak enough to shear when they are supposed to shear and this delicate balance between strength and weakness is hard to obtain even in this day and age of sophisticated metallurgy. Second, the above-described device relies on several O-rings to prevent exhaust gas from the burning propellant from entering the housing in which the piston held pintle is retained. One of the O-rings in particular is to prevent exhaust gas from leaking into the housing and exerting rearward pressure on the forward end of the pintle while the pintle is being retained forward. On the other hand, the pintle is designed in such a way that, once it has been released and forced rearwardly to decrease the exhaust area, exhaust gas is encouraged to leak into the housing, exert rearward pressure on its forward end, and retain it in its rearward position. At this time, the particular O-ring in question is bypassed by the exhaust gas due to the construction of the device. At any rate, a failure of the O-ring in question while it is supposed to be keeping gas out of the housing can result in premature shearing of the shear pin due to undesirable rearward pressure being placed on the forward end of the pintle.

It is the objective of this invention to overcome the drawbacks of the above-described device.

SUMMARY OF THE INVENTION

The present invention utilizes a housing suspended within the combustion chamber of a rocket motor in front of the nozzle throat, an explosive bolt mounted within the housing and a pintle retained forward at launch by the explosive bolt. During flight, the explosive bolt is exploded and releases the pintle rearwardly to a position where the pintle decreases the exhaust area of the nozzle throat.

BRIEF DESCRIPTION OF THE DRAWING

The single FIGURE is a cross-section through a device according to this invention.

DESCRIPTION OF THE PREFERRED EMBODIMENT

The invention may be best understood by referring to the single FIGURE of the drawing. The single FIGURE is a cross-section of the device of the invention showing a nozzle 10 adapted to screw into or be otherwise affixed into the rear of the combustion chamber or tube of a rocket motor (not shown). Suspended, by suspension means 11, from the nozzle is a housing 12. A fitting 16 is screwed into housing 12 and carries and positions the pintle assembly. Fitting 16 contains an explosive bolt 13 onto which a second fitting 14 is screwed. A pintle 15 is screwed into fitting 14. Thus it may be said that fitting 14 is utilized to mount pintle 14 on explosive bolt 13.

The assembly is designed such that when explosive bolt 13 fractures at fracture plane 17, fitting 14 and pintle 15 are released so that they can move rearwardly into nozzle throat area 18, shoulder 19 of fitting 16 and shoulder 20 of fitting 14 prevent fitting 14 and pintle 15 from simply sliding out of the rear end of the rocket. A crush ring 21 is utilized to absorb shock as shoulders 20 and 19 meet each other.

The head 22 of explosive bolt 13 resides in a recess 23 in the housing 12. The recess 23 is to prevent the head 22 from turning as the pintle 15 is being screwed into fitting 14 or as fitting 14 is being screwed onto explosive bolt 13 during assembly.

An opening 24 is provided through nozzle 10, suspension means 11 and housing 12 for a detonation wire for explosive bolt 13. Means for exploding an explosive bolt are well known and need not be gone into in detail here. It is sufficient to say that it is possible to either explode the explosive bolt at some predetermined set time after firing of the rocket or to remotely explode the explosive bolt whenever it is desired to do so.

In operation, pintle 15 is retained out of throat area 18 at launch time by explosive bolt 13 (and fitting 14). Then, at a desired time, the explosive bolt is detonated, fractures at fracture plane 17 and pintle 15 moves rearwardly until the meeting of shoulders 19 and 20 (buffered by crush ring 21) stop it. At this time, pintle 15 is in a position where it decreases the flow area for gas which may pass through throat area 18 of the nozzle.

What is claimed is:

1. A device for exerting influence over the thrust of a rocket while the rocket is in flight, said device comprising:
   a. a housing suspended within the combustion chamber of said rocket just forward of the nozzle throat of said rocket;
   b. an explosive bolt mounted within said housing;
   c. a pintle mounted on said explosive bolt in a manner such that when said explosive bolt is exploded said pintle will be released and move rearwardly into the nozzle throat of said rocket; and
   d. means for exploding said explosive bolt at a desirable time.

* * * * *